United States Patent
Davydov et al.

(10) Patent No.: US 6,491,973 B1
(45) Date of Patent: Dec. 10, 2002

(54) POWDER COATING COMPOSITION, PROCESS FOR THE PRODUCTION AND USE THEREOF

(75) Inventors: Evgueni Davydov, Düsseldorf (DE); Frank Dieter Zimmermann, Frontenhausen (DE)

(73) Assignee: Dupont Performance Coatings GmbH & Co. KG, Wuppertal (DE)

( * ) Notice: Subject to any disclaimer, the term of this patent is extended or adjusted under 35 U.S.C. 154(b) by 0 days.

(21) Appl. No.: 09/509,429

(22) PCT Filed: Sep. 30, 1998

(86) PCT No.: PCT/EP98/06199

§ 371 (c)(1),
(2), (4) Date: Mar. 28, 2000

(87) PCT Pub. No.: WO99/16837

PCT Pub. Date: Apr. 8, 1999

(30) Foreign Application Priority Data

Sep. 30, 1997 (DE) .......................................... 197 43 151

(51) Int. Cl.[7] .................. C09D 133/02; C09D 133/14; C09D 163/00; C09D 167/02
(52) U.S. Cl. .................. 427/195; 427/386; 525/109; 525/110; 525/118; 525/119; 525/438; 525/934
(58) Field of Search ................. 525/118, 119, 525/438, 109, 110, 934; 427/386, 195

(56) References Cited

U.S. PATENT DOCUMENTS

| | | | |
|---|---|---|---|
| 3,882,064 A | 5/1975 | Pregmon | |
| 5,321,063 A | 6/1994 | Shimada | |
| 5,498,783 A | * 3/1996 | Foukes | 525/165 |

FOREIGN PATENT DOCUMENTS

| | | |
|---|---|---|
| DE | 21 53 809 | 5/1972 |
| DE | 21 47 653 | 4/1973 |
| DE | 41 04 681 A1 | 8/1991 |
| DE | 41 14 209 A1 | 11/1991 |
| EP | 0 057 334 A2 | 8/1982 |
| JP | 60168771 | * 9/1985 |
| WO | WO 92/15724 | 9/1992 |

OTHER PUBLICATIONS

Derwent Information, "Anticorrosion Treatment of Galvanized Steel by Applying Zinc Phosphate Coating and Then Powder Coating of Synthet", Abstract BE 774773.
Derwent Information, "Iron Phosphate Treatment for Metal Surfaces . . . Degreasing and Acidic Treatment", Abstract FR 26813333.
Derwent Information, "Laminate of Metal Base, Epoxy and Fluorocarbon Resin Layers . . . Used for Roofing", Abstract JP 01040329.
Derwent Information, "Powdered Primer Coating Compensation for Zinc Galvanized Steel Materials—Comprises Epoxy", Abstract JP61250067.
Patent Abstracts of Japan, "Precoating Powder Coating Composition Giving Unique Pattern", Vol. 010, No. 013 (Jan. 18, 1986).

* cited by examiner

Primary Examiner—Patricia A. Short
(74) Attorney, Agent, or Firm—Pillsbury Winthrop LLP

(57) ABSTRACT

Powder coating composition obtainable by homogeneous mixing of a separately produced particulate component A prepared from one or more epoxy resins having an epoxy equivalent weight of 250 to 2500, one or more curing components together with conventional lacquer auxiliary substances and additives and optionally pigments and/or fillers and a separately produced particulate component prepared from one or more resins differing from A having an acid value of 20 to 70 and/or an OH value of 10 to 100, one or more curing components together with conventional lacquer auxiliary substances and additives and optionally pigments and/or fillers, in a mixing ratio of component A to component B of 1:99 to 50:50, relative to weight.

6 Claims, No Drawings

POWDER COATING COMPOSITION, PROCESS FOR THE PRODUCTION AND USE THEREOF

This application is the national phase of international application PCT/EP98/06199 filed Sep. 30, 1998 which designated the U.S.

FIELD OF THE INVENTION

This invention relates to powder coating compositions produced using a particular process for coating metal components. The metal components may be not only individual components and sheets, but also finished manufactured products.

BACKGROUND OF THE INVENTION

Metal surfaces, for example of aluminium and other non-ferrous metals and of steel, are provided with coatings, increasingly with powder coating compositions, for corrosion protection purposes. The metal surface must be finished for coating in such a manner that it ensures adequate adhesion of the powder coating. This is achieved, for example, by pretreating the metal surface with agents which cause the deposition of a microscopic layer of crystals, so passivating the surface with regard to corrosion and providing keying points for the powder coating material. Such pretreatment methods comprise, for example, chromating and phosphating, in particular zinc or iron phosphating.

In addition to aluminium and the alloys thereof as well as bright steel, galvanised steel is increasingly being used with a coating of corrosion- and weathering-resistant powder coatings. The galvanised steel may be produced by both the hot-dip and the electrogalvanisation processes. The particular advantage of using galvanised steel is that the zinc coating alone continues to provide protection from corrosion if the powder coating film is damaged. A higher level of corrosion protection may be achieved by such zinc coatings than is achieved by the above-stated passivation pretreatment of ungalvanised metal surfaces.

However, powder coating films do not adhere adequately to galvanised metal surfaces. In order to provide adhesion, galvanised metal surfaces must, for example, be pretreated with phosphating solutions, for example according to DE-A-21 53 809, FR-A-26 81 33, WO 92/15727, and are then coatable using a powder coating, for example based on polyester, epoxy, acrylate and alkyd resins.

It is furthermore possible initially to coat the galvanised steel surface with a primer, before subsequent coating operations are performed, c.f. for example the use of a powder primer based on an epoxy resin and an aromatic diamine according to JP-A 61 250 067.

The above-stated pretreatment methods require the additional processing steps of priming and phosphating and/or chromating and thus associated additional steps such as rinsing, drying, coating, stoving. Such processes are accordingly time-consuming and cost-intensive and, in the case of chromating, environmentally hazardous.

Steel or zinc surfaces may furthermore, for example, be coated with an epoxy powder coating substantially consisting of a bisphenol A epoxy resin and a phenolic crosslinking agent for subsequent coating with a lacquer based on a fluorocarbon resin according to JP-A-01 040 329. Potential applications include, for example, coloured roofing.

Powder coating compositions are known, the use of which does not require pretreatment, for example phosphating pretreatment. According to U.S. Pat. No. 3,882,064, rapid-curing powder coating compositions containing as binder an epoxy resin mixture together with polyethylene wax and dicyandiamide may be used on galvanised steel. Such coating compositions are suitable as protective coatings for containers for foodstuffs and beverages and are not intended for weathering-resistant coatings.

EP-A-0 057 334 describes coating galvanised metal with a powder coating, in which the metal is cleaned with acid and then rinsed before coating. During cleaning, for example using low concentration solutions of phosphorous acid, under certain temperature conditions the zinc surface undergoes only very slight attack accompanied by the formation of very small quantities of zinc phosphate crystals. Powder coatings based on epoxy, polyester and acrylic resins and mixtures thereof may be used as the coatings. Hybrids which are mentioned are, for example, mixtures of polyester and epoxy resins. The objective is to ensure the slightest possible attack on the zinc coating which provides corrosion protection while still ensuring good adhesion of the powder coating by rapid coating after drying. However, when used in exterior applications, these compositions are susceptible to weathering, especially on long-term exposure to the action of the weather.

Known hybrid powders, for example mixtures of polyester and epoxy resins in a 50:50 ratio, are produced using conventional powder coating technology by mixing all the components of a powder formulation, such as binder, curing agent, additives and pigments and fillers, in a dry mixer for a mixing time optimised for the type of mixer. The resultant mixed material (premix) is homogenised, for example extruded, by means of an extruder under temperature and rotational speed conditions optimised for the particular formulation, cooled using appropriate cooling means and pre-comminuted using a crusher. This pre-comminuted intermediate product is then finely ground in appropriate classifying mills to the grain size distribution adapted to the intended application. If such hybrid powders are applied onto metal substrates which have not been chemically pretreated, for example galvanised steel, corrosion protection problems may arise due to detachment of the powder film. Known hybrid powders of the above-stated composition moreover cannot be used as weather resistant coating systems.

SUMMARY OF THE INVENTION

The object of the present invention is accordingly to provide a specific coating material for metals and a specific process for the production of this coating material, such that good corrosion protection combined with good adhesion of the coating material on the metal surface may be achieved by application of a single layer and moreover such that, depending upon requirements, very good weather resistance is achievable, so combining several important lacquer properties in only one layer to be applied.

It has been found that this object may be achieved by a powder coating composition which is obtained by a selected processing method.

The present invention accordingly provides a powder coating composition obtainable by homogeneous mixing of a separately produced particulate component A prepared from one or more epoxy resins having an epoxy equivalent weight of 250 to 2500, one or more curing components together with conventional lacquer auxiliary substances and additives and optionally pigments and/or fillers and a separately produced particulate component B prepared from one or more resins differing from A having an acid value of 20 to 70 and/or an OH value of 10 to 100, one or more curing components together with conventional lacquer auxiliary substances and additives and optionally pigments and/or fillers, in a mixing ratio of component A to component B of 1:99 to 50:50, relative to weight.

The present invention also provides a process, in which a powder coating composition which contains A one or more epoxy resins having an epoxy equivalent weight of 250 to 2500, one or more curing components together with conventional lacquer auxiliary substances and additives and optionally pigments and/or fillers and B one or more resins differing from A having an acid value of 20 to 70 and/or an OH value of 10 to 100, one or more curing components together with conventional lacquer auxiliary substances and additives and optionally pigments and/or fillers in a mixing ratio of component A to component B of 1:99 to 50:50, is produced in such a manner that component A and component B are initially produced separately using conventional powder coating production processes and the two components A and B in the stated mixing ratio are then subjected to a further operation, for example an extrusion operation, to ensure homogeneous mixing of the two components.

The content of epoxy resin in component A may, for example, be in a range between 10 wt. % and 95 wt. %.

The curing component is present in conventional quantities, generally in a quantity suitable for reaction with functional groups of the resin component in order to achieve the desired degree of crosslinking.

Depending upon requirements, the epoxy resin may be replaced by other resins, for example epoxy novolak, phenolic and/or melamine resin and by resins which contain epoxy groups.

With regard to component B. the resin may, for example, be present therein in a quantity of 20 wt. % to 95 wt. %.

The curing agent content corresponds to the conventional quantities, in general a quantity suitable for reaction with functional groups of the resin component in order to achieve the desired degree of crosslinking.

Component B resins may, for example, be polyester resins, (meth)acrylate resins and modified copolymers. Polyester resins and/or (meth)acrylate resins are preferably used.

According to the invention, component A and component B are produced separately using conventional powder coating production methods, for example by mixing, extrusion, cooling, comminution optionally then followed by grinding to conventional grain sizes.

According to the invention, components A and B are in particulate form. "Particulate" should be taken to mean that components A and B are usable in powder form or in the form of a cooled, comminuted extrudate which has not been ground to conventional grain sizes. The cooled and comminuted extrudate may be coarsely and irregularly divided and described as being in "chip" form.

The resultant components A and B are thereupon mixed to yield a so-called dryblend mixture, wherein the ratio of component A to component B is 1:99 to 50:50. This mixture is subjected to a further homogenisation operation. Grinding to conventional powder grain sizes is then performed.

The further homogenisation operation for mixing the two components A and B may comprise any suitable process for homogeneously mixing the two components.

The components are preferably homogenised as a melt.

This may, for example, be achieved by extruding the two components A and B. To this end, components A and B are, for example, intensively premixed in dry form and then melted in an extruder, for example at temperatures of 70 to 130° C. and intensively mixed. The resultant extrudate is rolled out into thin layers, cooled and crushed to form coarse pellets, which may be ground in a mill to the desired grain size of the powder coating composition according to the invention, for example in a grain size range of 1 to 100 $\mu$m.

Components A and B may furthermore be homogenised by intensive mixing and melting of the components and then spraying them as a melt.

Another option for performing homogenisation from a melt comprises, for example, using a low molecular weight inert compound in the form of compressible fluids, for example carbon dioxide, as an auxiliary substance. In this case, the powder coatings A and B may be dissolved in or homogeneously mixed with the supercritical fluid and the resultant mixture depressurised by spraying. A and B are preferably homogeneously mixed as a melt, for example by extrusion.

Depending upon the required range of properties, mixtures of component A and component B in a ratio of 1:99 to 10:90 may be used for coating systems having very good weathering resistance and good adhesion or corrosion protection, while mixtures in a ratio of 50:50 to 15:85 may be used for coating systems having very good adhesion or corrosion protection and good weather resistance (in each case relative to weight).

The powder coatings used are based on known binder systems. These comprise, for example, epoxy, polyester and/or (meth)acrylate based resins optionally together with further modified copolymers. The term used here denotes "acrylic and/or methacrylic".

The component A epoxy powder coatings contain epoxy resins as the principal binder component. Examples of epoxy resins are reaction products prepared from epichlorohydrin with bisphenol, for example bisphenol A.

Conventional curing agents may be used for the epoxy resins. Epoxy resins often crosslink by means not only of those curing agents containing carboxyl groups, but also those containing amide or amino groups. Curing agents which may, for example, be used are dicyandiamide and the derivatives thereof, carboxylic acids or the anhydrides thereof.

The epoxy resin may be entirely or partially replaced by further resins such as epoxy novolak, phenolic resin, melamine resin and by resins which contain epoxy groups. Phenolic resins based on phenol and formaldehydes, as are for example known as resols or novolaks, may, for example, be used. Examples of melamine resins are butanol- and/or methanol-etherified melamines.

Polyester powder coating compositions in which the binder constituent comprises polyesters containing carboxyl and/or hydroxyl groups may be used as component B.

Polyesters containing hydroxyl groups are condensation products prepared from aliphatic, aromatic and/or cycloaliphatic polycarboxylic acids and polyalcohols.

Polycarboxylic acids which may, for example, be used are phthalic acid, 1,4-cyclohexanedicarboxylic acid, tetrahydrophthalic acid, adipic acid, sebacic acid, terephthalic acid, trimellitic anhydride and in general the anhydrides and esters thereof. Examples of polyalcohols are ethylene glycol, diethylene glycol, propylene glycol, hexanediol, neopentyl glycol, propanediol, trimethylolpropane, pentaerythritol, neopentyl glycol ester of hydroxypivalic acid. Mixtures thereof may also be used. Carboxy-functionalised polyesters may likewise be produced by reacting polycarboxylic acids and glycols, but with an excess of acids.

Mixtures of polyesters containing carboxyl and/or hydroxyl groups may also, in general, be used.

Curing agents which may be used are conventional curing agents, such as for example cycloaliphatic, aliphatic or aromatic polyisocyanates, crosslinking agents containing epoxy groups, such as for example triglycidyl isocyanurate (TGIC), polyglycidyl ethers based on diethylene glycol, glycidyl-functionalised (meth)acrylic copolymers as well as crosslinking agents containing amino, amido or hydroxyl groups.

Component B may also contain (meth)acrylate resins and modified copolymers as a binder constituent. Modified copolymers may be conventional copolymers with modifications, such as epoxy groups, carboxyl groups, hydroxyl groups, isocyanate groups and/or amide groups. They may, for example, each contain two of the stated functional groups. These resins may, for example, comprise modified (meth)acrylate resins, such as copolymers prepared from alkyl (meth)acrylates with glycidyl (meth)acrylates and olefinic monomers, such as styrene and/or styrene derivatives. They may also comprise modified vinyl copolymers, for example based on monomers containing glycidyl groups and one or more ethylenically unsaturated monomers, for example, alkyl (meth)acrylate, styrene, styrene derivatives, (meth)acrylamide or also grafted vinyl copolymers which are, for example, grafted with ethylenically unsaturated acids, ethylenically unsaturated acid derivatives or the anhydrides thereof.

The component B resins may be present individually or as mixtures.

Conventional curing agents are usable, such as for example solid dicarboxylic acids, for example having 10 to 12 carbon atoms, as well as carboxy-functional polymers.

Conventional quantities of inorganic and/or organic pigments, fillers and/or conventional lacquer auxiliary substances and additives may be added in order to produce components A and B according to the invention. Conventional lacquer auxiliary substances and additives comprise conventional lacquer additives as are usual in the lacquer sector. Quantities are within the conventional range familiar to the person skilled in the art. Components A and B according to the invention may, for example, each contain 0 to 50 wt. % of one or more pigments and/or fillers. The quantity of additives may, for example, be from 0.01 to 10 wt. %.

Examples of conventional auxiliary substances and additives for components A and B are levelling agents, degassing agents, thixotroping agents and accelerators and others. Levelling agents which may be used are, for example, (meth)acrylic polymers, (meth)acrylic copolymers, silicon copolymers, thixotroping agents which may be used are for example silicon compounds and accelerators which may be used are, for example, amino, amide and imidazole compounds, anhydrides and organic salts. Further conventional lacquer additives may furthermore be incorporated into the compositions of components A and B. These are additives which act, for example, to improve scratch resistance, adhesion, UV resistance, dispersibility, gloss and are familiar to the person skilled in the art.

A component A according to the invention may, for example, contain 40 to 70 wt. % of epoxy resin, 2 to 30 wt. % of curing agent, 0 to 50 wt. % of filler and 0 to 50 wt. % of inorganic and/or organic pigments, optionally together with further additional substances and additives.

Component B may, for example, contain 40 to 70 wt. % of polyester resin, 2 to 30 wt. % of curing agent, 0 to 50 wt. % of filler and 0 to 50 wt. % of inorganic and/or organic pigments, optionally together with further additional substances and additives.

Production of components A and B and mixing of the resultant components A and B may proceed using the conventional powder production processes described above, for example by extrusion processes.

Once ground using known grinding units, the powder coating composition produced according to the invention may have a conventional grain size distribution of 1 to 200 μm, preferably of up to 100 μm.

The powder coating composition according to the invention may be applied onto metal surfaces and stoved using conventional powder coating methods. Usable metals are, for example, aluminium and the alloys thereof, further non-ferrous metals together with steel and galvanised steel. These powder coating systems are stoved in accordance with the temperature and time conditions required for complete crosslinking. Stoving may, for example, be performed at object temperatures of 100° C. to 250° C. for a period of 40 to 1 minute.

Depending upon the requirements placed upon the coated object, chemical pretreatment or priming of the metal surface may be required.

The powder coating systems according to the invention are suitable for use in exterior applications on metal surfaces which are exposed to long-term weathering. The powder coating compositions are, for example, suitable for metal surfaces such as cladding elements, fencing systems, steel structures, garden equipment, motor vehicle components.

The powder coating composition according to the invention provides good adhesion and corrosion resistance combined with weathering resistance on metal surfaces, it frequently being possible to omit conventional pretreatment or priming. Depending upon requirements, powder coating systems according to the invention may purposefully be produced which have very good weather resistance and good corrosion protection, for example in cladding elements, or with good weather resistance and very good corrosion protection, for example in steel structures, especially those exposed to industrial atmospheres, by the combination according to the invention of component A and component B. Two or more important desired lacquer properties may thus purposefully be combined in only one layer to be applied, whereas multilayer coatings are conventionally required to achieve the desired lacquer properties.

DETAILED DESCRIPTION OF THE PREFERRED EMBODIMENTS

The following Examples are intended to illustrate the invention:

EXAMPLE 1

Production of Component A 500 parts by weight of an epoxy resin having an epoxy equivalent weight of 1500, 20 parts by weight of dicyandiamide, 10 parts by weight of silicone-based levelling agent, 150 parts by weight of barium sulfate and 200 parts by weight of titanium dioxide are mixed and then extruded in a conventional extruder at a temperature of 80 to 130° C. The composition is then cooled and comminuted and then ground to an average grain size of 20 to 80 μm.

EXAMPLE 2

Production of Component B 500 parts by weight of a polyester resin having an OH value of 50 (COOH value of 40), 37 parts by weight of a conventional curing agent, 6 parts by weight of a conventional accelerator, 10 parts by weight of a silicone-based levelling agent, 150 parts by weight of barium sulfate and 200 parts by weight of titanium dioxide are mixed, extruded, comminuted and ground to an average grain size of 20 to 80 μm as in Example 1.

EXAMPLE 3

Testing of Weather Resistance and Corrosion Resistance

Components A and B produced by way of example according to Examples 1 and 2 are mixed in the following ratios (relative to parts by weight):

1. A:B=5:95
2. A:B=10:90
3. A:B=30:70
4. A:B=50:50

These mixtures are homogenised in an extruder at a temperature of 80 to 130° C. and then ground to a grain size range of 1 to 100 μm. The resultant powder is applied onto a degreased steel sheet to a film thickness of 60 to 100 μm and stoved for 10 minutes at an object temperature of 200° C.

The table shows the test results relating to the behaviour of the powder coating layer on the metal surface (corrosion protection and weather resistance). These results are compared with the results obtained on application of a conventional polyester powder coating (table, item 1), epoxy powder (table, item 2), hybrid powder coating (items 3 and 4 according to the table) and on application of a two-layer powder coating, in which the first layer consists of an epoxy powder coating and the second layer of a polyester powder coating (c.f. table, item 9).

Test results from the salt spray test to DIN 50021 (1000 hours) and the QUVB rapid weathering apparatus (250 hours) revealed that the compositions according to the invention according to items 5 and 6 exhibit good weather resistance simultaneously combined with good corrosion resistance, in particular in the case of mixtures of components A and B in a ratio of 5:95 to 10:90. These test results were virtually comparable with a two-layer structure according to item 9 in the table. These results are surprising because, when used as the sole coating substance, the components A and B used in the formulation or hybrid powder coatings are not capable of combining the two essential properties, very good corrosion protection and very good weather resistance, in a single material on metal substrates which have not been specially pretreated.

In contrast, coatings based on conventional hybrid powders according to items 3 and 4 exhibit poorer gloss values and were not corrosion-resistant.

If, after separate extrusion, components A and B according to Examples 1 and 2 are dry mixed as a powder in the A:B ratio according to the invention of 1:99 to 50:50, but are not homogenised again according to the invention, and the resultant powder mixture is applied in the conventional manner under the above-stated conditions, adequate weather resistance is indeed achieved, but adequate adhesion of the coating on exposure to mechanical stress is not, and thus only slight corrosion protection or adequate corrosion protection combined with only slight weather resistance is achieved.

| | | QUVB exposure to light; residual gloss after 250 h, % | Corrosion test to DIN 50031 on degreased steel (creepage from score after 1000 h, mm) |
|---|---|---|---|
| 1 | Polyester powder coating (as B) | >50 | completely detached after 240 h |
| 2 | Epoxy powder coating (as A) | 3 | 12 |
| 3 | Conventional hybrid powder B:A = 50:50 | 12 | completely detached after 240 h |
| 4 | Conventional hybrid powder B:A = 70:30 | 20 | completely detached after 240 h |
| 5 | Invention B:A = 95:5 | >50 | 16 |
| 6 | Invention B:A = 90:10 | 50 | 14 |
| 7 | Invention B:A = 70:30 | 25 | 12 |
| 8 | Invention B:A = 50:50 | 15 | 12 |
| 9 | 2 layers: 1$^{st}$ powder A, 2$^{nd}$ powder B | >50 | 12 |

What is claimed is:
1. A powder coating composition comprising:
   a particulate component (A) prepared from
   an epoxy resin prepared from epichlorohydrin and bisphenol having an epoxy equivalent weight of 250 to 2500 and at least one resin from the group consisting of epoxy novolak resins, phenolic resins and melamine resins, or prepared from
   at least one epoxy resin having an epoxy equivalent weight of 250 to 2500 and at least one resin selected from group consisting of epoxy novolak resins, phenolic resins, and melamine resins,
   at least one curing component,
   conventional lacquer auxiliary substances and additives,
   and optionally, one or more ingredients selected from the group consisting of a pigment and a filler;
   a particulate component (B) prepared from
     at least one resin selected from the group consisting of polyester resins, (meth)acrylate resins and modified copolymers, the at least one resin of particulate component (B) differing from the at lest one epoxy resin of particulate component (A), the at least one resin of component (B) having an acid value of 20 to 70, an OH value of 10 to 100, or a combination thereof,
     at least one curing component,
     conventional lacquer auxiliary substances and additives,
     and optionally, one or more ingredients selected from the group consisting of a pigment and a filler,
   wherein particulate component (A) and particulate component (B) are prepared separately by mixing, extruding, cooling and grinding; and
   wherein particulate component (A) and particulate component (B) are mixed in a ratio of 1:99 to 50:50, relative to weight, and homogenized by melting in an extruder.
2. A method for using the powder coating composition according to claim 1, comprising:
   coating metal surfaces with said powder coating composition.

3. A powder coating composition according to claim 1, wherein particulate component (A) and particulate component (B) are mixed in a ratio of particulate component (A) to particulate component (B) of 1:99 to 10:90.

4. A powder coating composition according to claim 1, wherein particulate component (A) and particulate component (B) are mixed in a ratio of particulate component (A) to particulate component (B) of 50:50 to 15:85.

5. A process for producing a powder coating composition, comprising:

producing a particulate component (A) prepared from an epoxy resin prepared from epichlorohydrin and bisphenol having an epoxy equivalent weight of 250 to 2500 and at learn one resin selected from the group consisting of epoxy novolak resins, phenolic resins and melamine resins, or prepared from at least one epoxy resin having an epoxy equivalent weight of 250 to 2500 and at least one resin selected from the group consisting epoxy novolak resins, phenolic resins, and melamine resins, at least one curing component, conventional lacquer auxiliary substances and additives, and optionally one or more ingredients selected from the group consisting of a pigment and a filler by mixing, extruding, cooling and grinding;

producing particulate component (B) prepared from at least one resin selected from the group consisting of polyester resins, (meth)acrylate resins and modified copolymers, the at least one resin of particulate component (B) differing from the at least one epoxy resin of particulate component (A), the at least one epoxy resin of component (B) having an acid value of 20 to 70, an OH value of 10 to 100, or a combination thereof, at least one curing component conventional lacquer auxiliary substances and additives, and optionally, one or more ingredients selected from the group consisting of a pigment and a filler, by mixing, extruding, cooling, and grinding;

mixing particulate component (A) an particulate component (B) in a ratio of 1:99 to 50;50, relative to weight, and homogenizing particulate component (A) an particulate component (B) together by melting in an extruder.

6. A method for using a powder coating composition produced according to the process of claim 5, comprising:

coating metal surfaces with said powder coating composition.

* * * * *